Mar. 27, 1923.
J. A. NORDIN
KNIFE GUARD FOR MEAT SLICING MACHINES
Original Filed Feb. 20, 1922    2 sheets-sheet 1
1,449,832
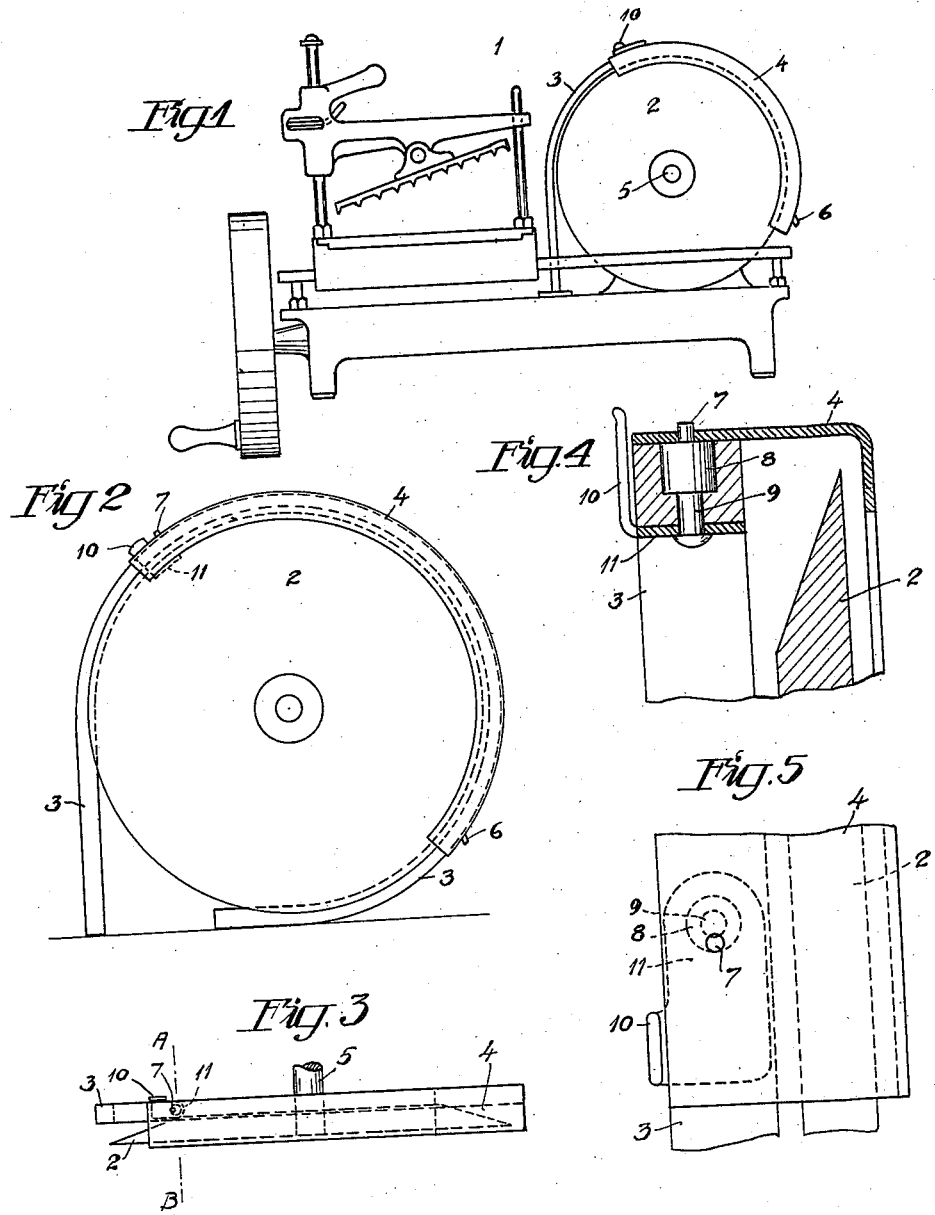
Inventor
J. A. Nordin,
By Marks&Clerk
Attys.

Mar. 27, 1923.

1,449,832

J. A. NORDIN

KNIFE GUARD FOR MEAT SLICING MACHINES

Original Filed Feb. 20, 1922   2 sheets-sheet 2

Inventor
J. A. Nordin,
By Marks Clerk
Attys.

Patented Mar. 27, 1923.

1,449,832

UNITED STATES PATENT OFFICE.

JOSEF AUGUST NORDIN, OF STOCKHOLM, SWEDEN, ASSIGNOR TO AKTIEBOLAGET STILLE-WERNER, OF STOCKHOLM, SWEDEN, A CORPORATION OF SWEDEN.

KNIFE GUARD FOR MEAT-SLICING MACHINES.

Application filed February 20, 1922, Serial No. 538,005. Renewed February 14, 1923.

*To all whom it may concern:*

Be it known that I, JOSEF AUGUST NORDIN, a subject of the King of Sweden, residing at Gotgatan 14, Stockholm, in the Kingdom of Sweden, have invented certain new and useful Improvements in Knife Guards for Meat-Slicing Machines, of which the following is a specification.

In meat-slicing machines it is, evidently, of great importance in hygienic respect, that such members, which may come into contact with the meat, are easily accessible and detachable for cleaning and washing. The knife guard is a detail of the said machine, to which sufficient attention has not been paid in the said respect. As an example may be mentioned, that some machines hitherto generally used are provided with a knife guard consisting of a tube, provided with a longitudinal slot for the disk knife. Remnants of meat and the like may, evidently, easily accumulate in the said tube.

This invention relates to a knife guard, which is detached through a simple manipulation and is characterized chiefly by the fact, that the guard is fixed to a support for the same by means of an eccentric device in such manner, that by shifting the said device in one direction the knife guard is disengaged from the said support and by shifting the device in the opposite direction the guard is stretched round the support and fastened to the same.

Figure 6:
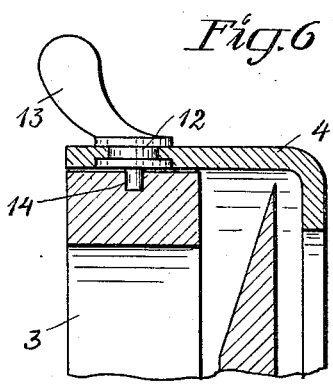
Figure 7:
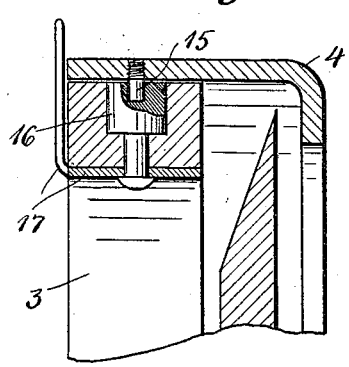

A form of the invention is shown as an example in the accompanying drawing. Fig. 1 is a side view of a meat-slicing machine provided with a knife guard arranged in accordance with this invention. Fig. 2 is a side view and Fig. 3 a top view of the disk knife and its guard. Fig. 4 is a section on the line A—B of Fig. 3 on a greater scale, and Fig. 5 shows the same parts in a top view. Figures 6 and 7 are enlarged sectional fragmentary details of two further forms of the invention.

The meat-slicing machine 1. Fig. 1, is provided with the ordinary disk knife 2, fixed to the rotatable shaft 5. A support 3 extends round a portion of the periphery of the said knife 2 and is adapted to carry the knife guard 4, made from a band of sheet metal preferably L-shaped in cross section, Fig. 4. Owing to the said construction of the guard, it may easily be cleaned and washed.

A necessary condition of the washing being really effected is that the knife guard may easily be detached and fixed. According to the form of the invention shown in the drawing an opening is provided in each end of the guard. One of the said openings is adapted to receive a pin 6, fixed to the support 3, while the other opening is adapted to receive a pin 7 extending outward from a member 8 rotatably mounted in a recess provided in the support 3. The said pin 7 has an eccentric position in respect of the rotary axis of the member 8, as shown in Fig. 5. From the member 8 a pin 9 extends downwards through an opening in the support, the said pin 9 having a position concentric to the rotary axis of the member 8, Figs. 4 and 5. An arm 11 provided with a handle 10 is fixed to the pin 9 for instance by riveting.

When the parts of the connecting device are in the positions shown in the drawing, the knife guard 4 is fixed to the support 3. For the disengaging of the guard it is only necessary to move the handle 10 outward from the support 3. The pin 7 then moves along an arc toward the fixed pin 6, so that the tension of the guard is removed and the guard can easily be taken off the pins and its support. The fixing of the guard is effected in the reversed order after the guard has been slid on the pins.

The invention may, evidently, be modified in some respects without exceeding the limits of the same. Thus, for instance, an eccentric device consisting of a member 12, having a handle 13 and an eccentric pin 14, may be provided in the guard 4, the said pin engaging an opening provided in the support 3, as shown in Fig. 6. As a further modification may be mentioned the providing of the guard 4 with a pin 15 engaging an eccentric opening in a member 16, Fig. 7, the said member being journaled in the support 3 and provided with a handle 17.

I claim:

1. In a meat-slicing machine a knife guard, a support for the guard, means for connecting the guard with the support and an eccentric device by the shifting of which the guard is stretched on the said support and fixed to the same or released from the support respectively.

2. In a meat-slicing machine a knife guard, a support for the same and an eccentric device, by the shifting of which the guard is stretched round the said support and fixed to the same or released from the support respectively, the said eccentric device comprising a member rotatably mounted in the guard and provided with an eccentric pin, adapted to engage the guard, and with a concentric pin provided with a hand lever.

In testimony whereof I have affixed my signature in presence of two witnesses.

JOSEF AUGUST NORDIN.

Witnesses:
INEZ SWENSON,
ROBERT APELGREN.